Patented Nov. 12, 1929

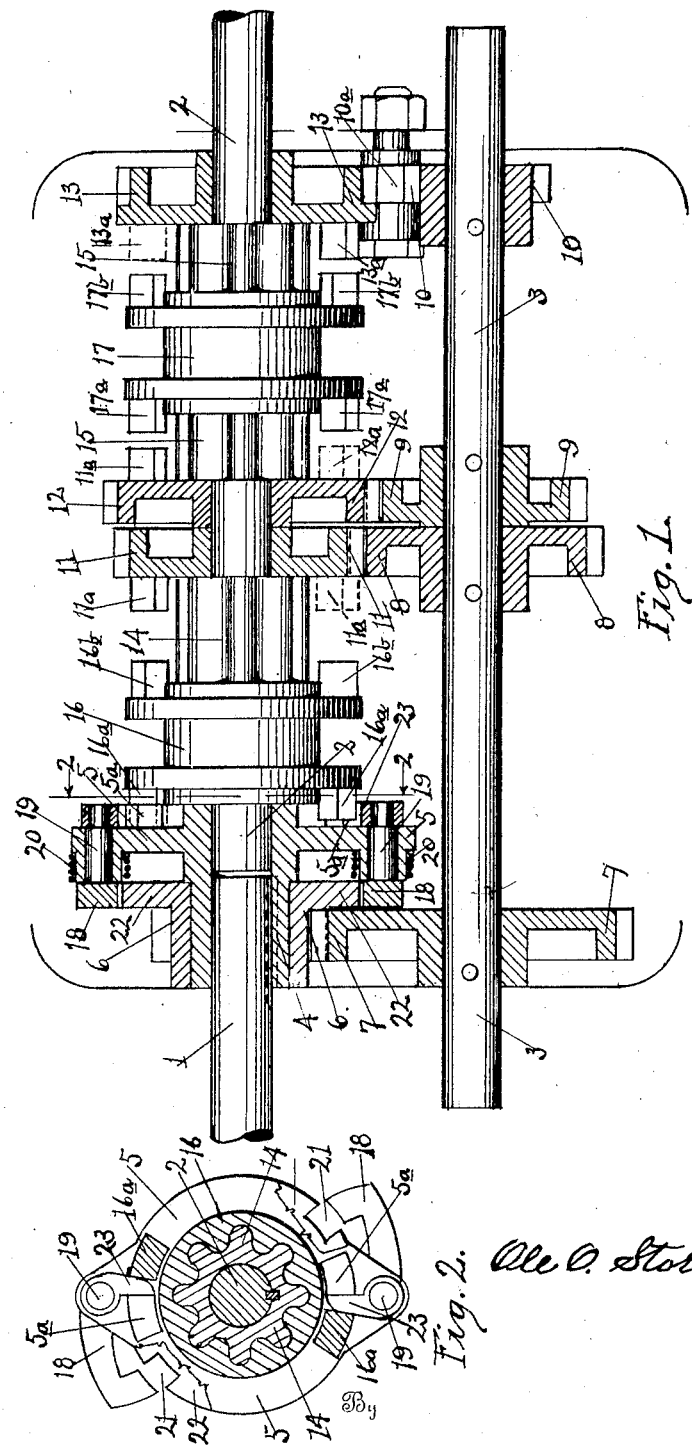

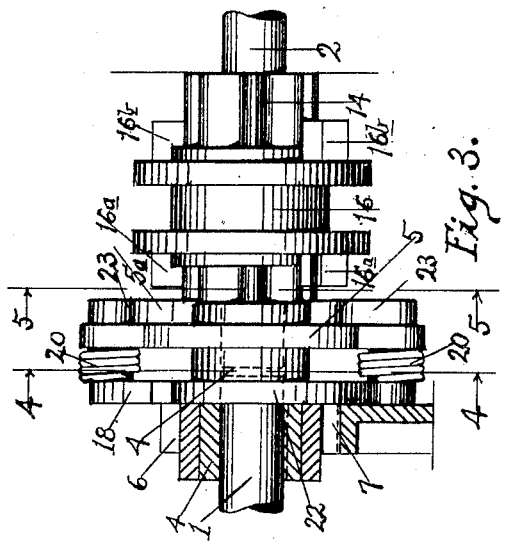
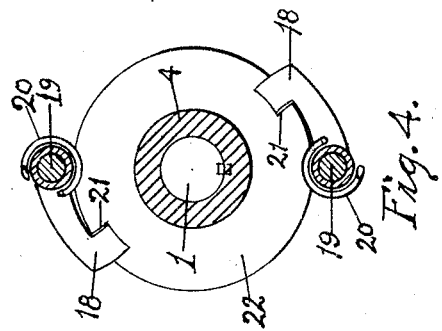
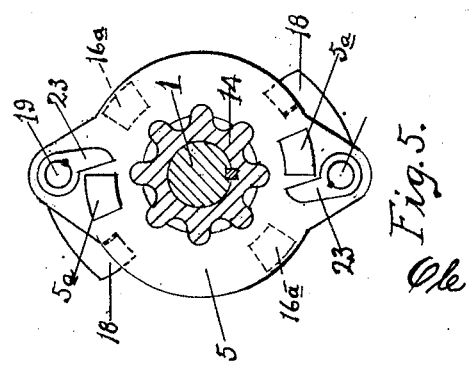

1,735,187

UNITED STATES PATENT OFFICE

OLE O. STORLE, OF TACOMA, WASHINGTON

TRANSMISSION MECHANISM

Application filed December 6, 1924. Serial No. 754,407.

This invention relates to improvements in change speed mechanism for motor driven vehicles, and more particularly to apparatus for shifting the driving connection between two shafts from one set of gears of a given ratio to another set of different ratio.

Heretofore the common practice in the construction and operation of change speed mechanism of the inter-geared type has been to shift one or more gears bodily from and into engagement with other gears in order to effect a change of speed in the driven shaft. This operation results, as is well known, in considerable noise and wear and tear on the gears and associated parts each time a shift is made. Other disadvantages are also attendant upon the operation of change speed mechanism of this general character, as will be readily understood by those skilled in the art.

One of the objects of my present invention is to obviate this wear and tear and attendant disadvantages by providing a change speed mechanism wherein the gears connecting the main drive shaft with the counter or driven shaft may remain in constant engagement and the device for operatively connecting the gear wheels with the driven shaft, being bodily movable relatively to the latter successively through its various positions of adjustment.

Another object of the invention is to provide means as a part of the movable element of the mechanism, adapted to engage and cooperate with like means carried by the gear wheels for effecting the inter-connection or driving engagement therebetween upon shifting said movable element into any of its operative positions.

A still further and more novel object of the invention is to provide means whereby the movable element on the driven shaft may in one of its operative positions so engage and cooperate with the operative element of the drive shaft as to cause the driven shaft to rotate in line, force, and unison therewith, while all gears in the transmission mechanism will rest in an inoperative state until a shift of the movable element is made to release the driven shaft and engage said gears in service operation.

These objects and advantages will be apparent to those skilled in the art from a reading of the following specification taken in connection with the accompanying drawing wherein one form of the invention is illustrated.

In the drawings:

Fig. 1 is a sectional view of one form of the invention, certain parts being shown in elevation.

Fig. 2 is a sectional view taken on the line 2—2 in Figure 1.

Fig. 3 is a view of the drive element shown more in elevation than in Figure 1 to more clearly illustrate the operative mechanism.

Fig. 4 is a section on the line 4—4 in Figure 3, and

Fig. 5 is a section on the line 5—5 in Figure 3.

Referring more in detail to the drawings, the main or drive shaft is designated as 1, the driven shaft as 2, and the transmission shaft as 3. On the end of shaft 1 is fixed or splined an annular sleeve, 4, extended to form a bearing in which the end of the driven shaft 2 is inserted to rotate in alignment with the drive shaft 1. An integral part of this extended end consists of a disc wheel 5 on which is fixed the operative means to engage the movable element by which the speed of the driven shaft 2 is changed. On the annular sleeve 4 is loosely mounted the drive gear 6 to be in constant mesh with the main gear 7 fixed on the transmission shaft 3. On this shaft are fixed other different sized gears 8, 9, and 10 each of which is in constant mesh with its respectively operative gear 11, 12, and 13 loosely mounted on the driven shaft 2. The gear 11 is retained in meshing position with gear 8 by a grooved cylindrical sleeve 14, splined or fixed on shaft 2, while a grooved cylindrical sleeve 15 likewise fixed, holds gears 12 and 13 in meshing position with the gears 9 and 10 respectively. The movable shifting elements 16 and 17 are made with grooved interiors to fit and slide on the grooved sleeves 14 and 15 respectively and are formed to receive the sleeve shifting members which may be of the well known types.

The novel operative device is in the mechanism by which the drive gear 6 is automatically put in operation or set free to be inoperative and with it all the gears in the transmission mechanism. As shown in Figures 1 and 2, gear 6 is idle and the shaft 2 is being driven in direct unison with the drive shaft 1, and in Figures 3, 4, and 5 the mechanism is so set that gear 6 is made operative and shaft 2 is idle and in readiness to have the desired speed changed thereto. This change in the operation of gear 6 is accomplished by means of a pair of spring actuated dogs 18, pivotally mounted at 19 on the outer rim of the disc wheel 5. The dogs are actuated by the coil spring 20 and when free, automatically clutch into the notches 21 in the edge of the disc wheel 22, an integral part extending from gear 6, shown in Figure 2 by breaking out a segment of disc wheel 5. Each pivot shaft 19 has an inwardly extended lever arm 23 on the face of disc wheel 5. On the face of wheel 5 are engaging lugs 5$^a$, one side of which is in alinement with the centers of pivot shafts 19 and shaft 2. On the side of movable shifting element 16 facing disc wheel 5 are engaging lugs 16$^a$ designed to contact lever arms 23 and turn them against lugs 5$^a$. This will throw dogs 18 out of notches 21 in the integral disc 22 of gear 6 which is thereby made free to be idle and with it all the gears in the entire mechanism. When the element 16 is shifted to the neutral position shown in Figure 3, the dogs 18 will be set by springs 20 and gear 6 will be again set in rotation with the drive shaft 1 and likewise all gears operated thereby.

The change of speed will be effected as follows: Movable element 16 will be shifted to the right till lugs 16$^b$ thereon will engage lugs 11$^a$ on gear 11, equal in size with gear 8. The shaft 2 will then be driven at a speed proportionate with the size of gear 6 to gear 7 which we will assume is one-half. This may be termed the intermediate gear. For low gear, the gear 9 is made suitable smaller than its companion gear 12. The element 16 is now to be shifted to the neutral position shown in Figure 3 while element 17 is shifted to the left till lugs 17$^a$ engage lugs 12$^a$ on gear 12 and shaft 2 is driven under low gear.

In order to reverse the driven shaft 2, the gears 10 and 13 are meshed with a third gear 10$^a$ mounted to idle between them. Now by shifting element 17 to the right till lugs 17$^b$ engage lugs 13$^a$ the rotation of shaft 2 will be reversed. It will be observed gear 10 is made small to secure a still slower speed than low gear speed for safety.

While but three changes of speed and one reverse are possible in the form of the invention herein illustrated and described, it will clearly appear to those skilled in the art that additional changes in speed may be added to secure any desired speed or power without departing from the spirit of the invention.

It will also be obvious that the present improvements are susceptible of various modifications to secure results without departing from the scope of the appended claims.

The desired object to avoid useless noise and wear and tear on the several gears is attained. The gears are only in service while speed shifts are being made and all are at rest when the high speed is used, and no gears are required to be thrown out or in gear at any time.

I claim:

1. A transmission gearing comprising a drive-shaft, a sleeve fixed on said shaft to rotate therewith and formed with a radially extending flange, a driven shaft journaled in said sleeve, a drive-gear loosely mounted on said sleeve and provided with a radially extending flange formed with peripherally disposed recesses, spring-influenced dogs pivotally mounted on the radial flange of the aforementioned sleeve of the drive-shaft and disposed to engage said peripherally disposed recesses, levers connected to the pivots of said dogs, and a shiftable member provided with lugs positioned to be brought into engagement with the levers of the dogs upon shifting said member to disengage said dogs from inter-locking engagement with said radial flange.

2. A transmission gearing comprising a drive-shaft, a sleeve fixed on said shaft, a driven shaft having one end fitted loosely in said sleeve, an external radial flange forming a part of said sleeve, rotative pins extending through said flange and provided at one end with a dog and at the other with a lever, a gear loosely mounted on said sleeve and formed with a radially extending flange having peripherally disposed recesses adapted to receive said dogs to interlock the two mentioned radially extending flanges together, a clutch mounted on the driven shaft for locking, at will, said shaft to the sleeve which carries the locking dogs, and lugs carried by the clutch and positioned to be brought into engagement with the levers of the dogs on shifting the clutch to retract the dogs from interlocking engagement with the radial flange of the gear loosely mounted on the sleeve.

OLE O. STORLE.